Oct. 16, 1934.   J. W. ANDERSON   1,977,538
AUTOMOBILE RADIATOR SHUTTER CONTROL

Filed April 2, 1931

INVENTOR.
John W. Anderson
BY Slough and Canfield
ATTORNEY.

Patented Oct. 16, 1934

1,977,538

UNITED STATES PATENT OFFICE 1,977,538

AUTOMOBILE RADIATOR SHUTTER CONTROL

John W. Anderson, Gary, Ind.

Application April 2, 1931, Serial No. 527,202

16 Claims. (Cl. 236—35)

This invention relates to means and methods for automatically opening and closing the vanes of automobile radiators and particularly to means and methods for effecting this result responsive to changes of temperature of the automobile engine or of the circulating cooling fluid medium thereof.

It is one of the objects of this invention to provide an improved method and means for operating the radiator shutters of an automobile engine in response to changes of engine temperature.

Another object is to provide an improved electrically actuated radiator shutter control mechanism operating automatically in response to changes of engine temperature.

It is another object to provide an improved method and means for automatically controlling the radiator shutters of a motor car, in which an electro-responsive power device connected to the shutters is adapted to operate to open and close them, and a current controller disposed remotely relatively to the power device is adapted to effect variable operation of the device in response to variations of engine temperature.

Another object is to provide a radiator shutter control means and method in which a thermally actuated power device connected to the shutters is adapted to move to position the shutters in various positions within a range of movement thereof in response to corresponding amounts of heat energy stored in the power device, and in which an electric controller supplies electrical heat energy to the device in correspondence with the engine temperature.

Another object is to provide a radiator shutter control method and means of the class referred to in which the power device moves the shutters to various operative positions within a range of movement in response to varying rates of heat energy supplied to the device and in which an electric controller thermally responsive to variations of engine temperature transmits energy to the device at corresponding varying rates.

Other objects will be apparent to those skilled in the art in which my invention appertains.

My invention is fully disclosed in the following description taken in connection with the accompanying drawing, in which:—

Figure 1:
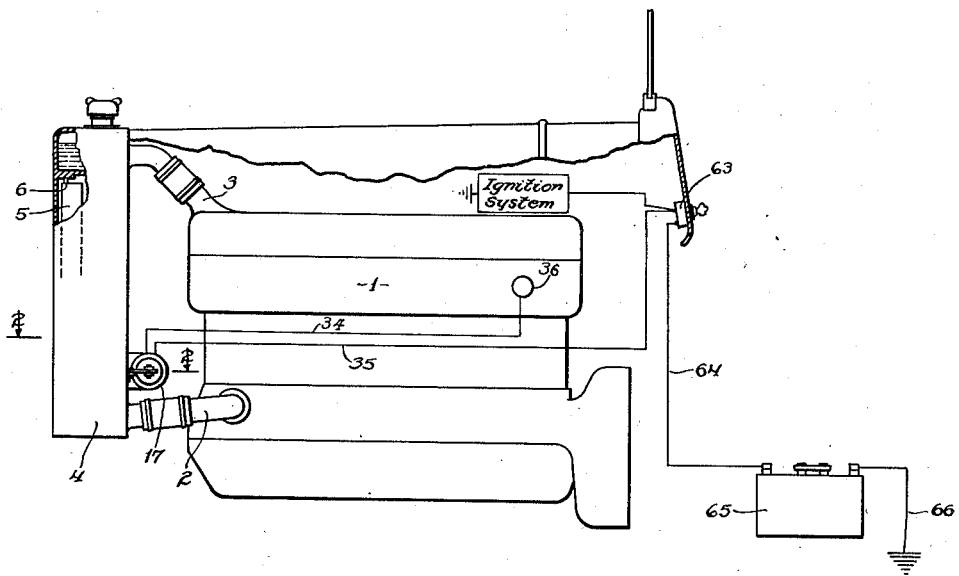
Fig. 1 is a side elevational view in simplified form of a motor vehicle engine and radiator, and illustrating an embodiment of my invention applied thereto.
Figure 2:
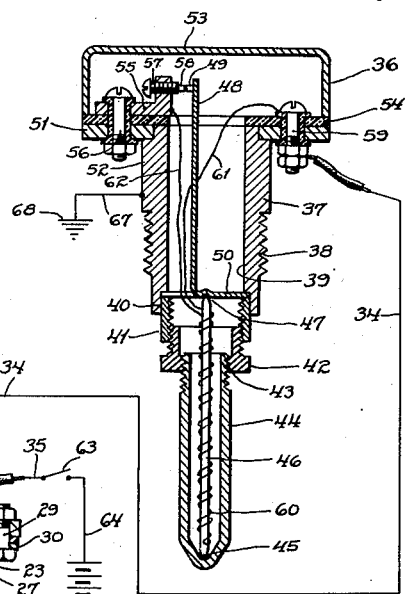
Fig. 2 is a somewhat diagrammatic view illustrating to an enlarged scale and in cross-sectional view, apparatus embodying my invention as shown in Fig. 1, the parts of the apparatus illustrated in Fig. 2 being shown in different positions from those illustrated in Fig. 1.
Figure 2:
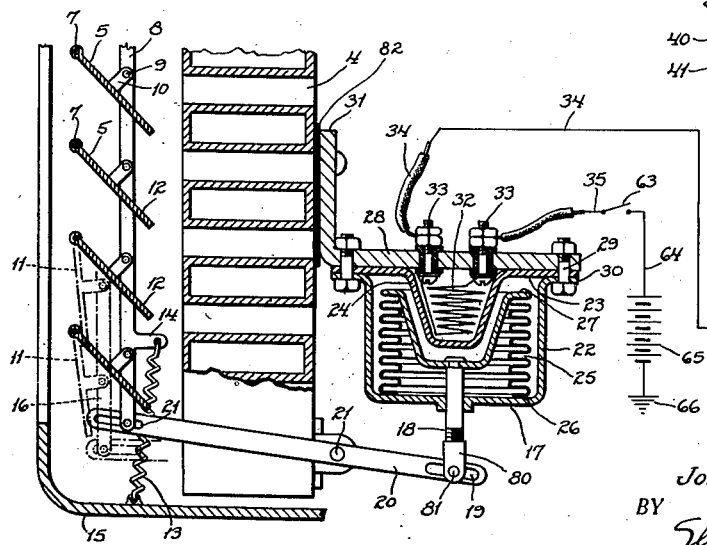

Referring to the drawing, I have shown at 1 the engine proper. The engine is of the type having a water jacket in which cooling water may flow, water entering the jacket at a lower portion thereof by a conduit 2, leaving it by an upper portion thereof by a conduit 3 and flowing from the conduit 3 to the conduit 2 through a radiator 4 which may be of any known or suitable construction. Forwardly of or in the forward part of the casing of the radiator 4, is provided a plurality of shutter vanes 5—5. The vanes 5 are preferably mounted to oscillate on vertical axes by being provided with pivot bearings at their upper and lower ends such as the pivot bearing 6 shown for the upper end of one of the vanes in Fig. 1. In Fig. 2, in which the vanes and radiator are shown in the position as if viewed from the plane 2—2 of Fig. 1, the lower pivot bearing 7—7 of the vanes 5 is indicated.

The vanes are all connected by a bar 8 to which, as at 9, lugs 10 on the vanes 5 are pivoted. Longitudinal movement of the bar 8 will, in a well known manner, move all of the vanes simultaneously from a closed position, indicated for two of the vanes in broken lines at 11—11, to an open position indicated in solid lines at 12—12. At different positions of the bar 8, different open positions of the vanes 5 admitting different amounts of cooling air to the radiator 4 will be effected. A spring 13 secured at one end to a lug 14 on the bar 8 and at the other end to a stationary point on the casing 15 of the radiator may be provided to normally move the bar 8 to the closed vane position, this position for the bar being indicated in broken lines at 16.

To operate the bar 8, a device shown generally at 17 has a stem 18 slidably connected as at 19 to one end of a lever 20 pivotally connected as at 21 to a stationary point such as a suitable support on the radiator casing, and at its other end slidably connected as at 21 to the end of the bar 8.

Longitudinal reciprocation of the stem 18 in a manner to be described, will reciprocate the lever 20 and variously move the bar 8 to variously position the vanes 5—5.

The power device 17 comprises an outer generally cylindrical hollow, preferably sheet metal, casing 22, generally of cup-form, the open end of which is sealed by a sheet metal end 23 provided, approximately along the axis of the cup 22, with an inwardly projecting, generally conical, portion 24. Within the housing 22 is a sheet metal bellows 25 of the generally cylindrical corrugated type, sealed at one axial end as at 26 to the housing 25, and at its opposite end sealed upon a head 27 preferably formed from sheet metal and generally of conical shape to adapt it to nest with the portion 24. The inner end of the head 27 has connected to and sealed therewith the inner end of the stem 18 above referred to, the stem projecting therefrom outwardly through a suitable recess in the casing 22.

The bottom 23 and casing 22 are sealedly joined together and rigidly secured to a supporting base 28 by bolts 29 passing through suitable perforations in the base 28, bottom 23 and an outwardly extending flange 30 on the casing 22. The base 28 is rigidly connected to a stationary support such as the radiator casing by a bracket portion 31 of the base 28.

The space enclosed by the casing 22, bellows 25, head 27 and bottom 23 has disposed therein a quantity of thermally expansible fluid not shown in the drawing.

Within the recess formed by the hollow conical portion 24 of the bottom 23, is disposed an electric heater 32 having terminal connection with a pair of bolts 33—33 extending through the base 28 and insulated therefrom and externally connected to circuit wires 34 and 35. When electric current is caused to flow through the heater 32 in a manner to be described, the heat thereof is transmitted through the wall of the conical portion 24 to the thermally expansible fluid, causing the same to expand and to collapse the bellows 25, exerting an outward thrust on the stem 18 to move the vanes 5 to a position corresponding to the temperature of the expansible fluid, and upon cessation of current in the heater 32 or upon a diminution of the temperature of the fluid, the fluid contracts and permits the bellows 25 to expand and retract the stem 18 to move the vanes 5 toward or to their closed position.

The means for supplying current to the heater 32 will now be described.

Indicated generally at 36 I have illustrated a thermally responsive electric controller. The controller 36 comprises a generally hexagonal body 37 provided with external pipe threads 38 by which it may be screwed into the external wall of the water jacket of the engine 1.

The body 37 is hollow as shown at 39, and at its inner end is counter-bored as at 40 to receive an internally threaded sleeve 41, the sleeve being permanently pressed into the counter-bore 40. Into the sleeve 41 is adjustably threaded an adjustment nut 42 provided with internal threads 43 into which is threaded the open end of a thimble 44, the closed end of which is formed generally conical to provide a bearing recess 45. The thimble 44 is preferably formed from thermally expansible material such as brass. Disposed longitudinally within the thimble 44, extending entirely therethrough and to a point adjacent the outer end of the sleeve 41 is an expansion element 46 formed from thermally expansible material such as metal in the form of a slender rod, pointed at both ends, one pointed end resting in the bearing portion 45 of the thimble and the opposite pointed end lodged in a recess 47 in a switch arm 48 to be described.

The switch arm 48 extends axially through the body 37 and is preferably formed from resilient sheet metal and carries on its outer end a switch contact 49. At its inner end it is preferably formed integrally with a disc 50 disposed transversely of the body 37 and permanently clamped between the outer end of the sleeve 41 and the bottom of the counter-bore 40. The disc 50 is provided with the above mentioned recess 47 in which the inner end of the expansion element 46 is disposed.

At its outer end the body 37 is provided with a head 51 in the form of a disc press-fitted upon a reduced portion 52 of the body. The head 51 is surmounted by a switch casing 53 and an insulating base 54 disposed between the casing 53 and the head 51. A bracket 55 is mounted on the insulating base 54, being secured thereto by a bolt 56 extending through suitable perforations in the bracket 55, base 54 and head 51 and insulated therefrom. The bracket 55 has screw-threaded therein an adjustable screw 57 carrying on its end as at 58 a contact engageable with the contact 49.

A terminal bolt 59 also extends through the base 54 and head 51 and insulated therefrom.

Upon the expansion element 46 is wound an electric heating winding 60, one terminal wire 61 of which is connected to the bolt 59, and the other terminal wire 62 of which is connected to the bracket 55. The circuit wire 34 above referred to is connected externally to the bolt 59.

The contact 49 is normally in engagement with the contact 58 and upon expansion of the expansible element 46 in a manner to be described, the force of the element 46 exerted longitudinally on the disc 50 resiliently springs the same sufficiently to tilt the switch arm 48 to move the contact 49 carried thereby out of engagement with the contact 58. When the body 37 is screwed into the engine jacket wall, the thimble 44 is thereby projected into the circulating water or other fluid in the jacket and is subjected to the temperature thereof.

The wire 35 above referred to is preferably carried to a switch 63 on the instrument board of the motor vehicle from which switch a circuit wire 64 is led to a battery or other source of current 65 having a ground connection 66. The body 37 and hence the disc 50 and switch arm 48 are grounded on the engine casing, the ground connection being indicated at 67—68 in Fig. 2.

The operation of the embodiment of my invention illustrated and described above is as follows. When the engine 1 is not in operation, the switch 63 will be open and to insure that this condition may be obtained the switch 63 may be adapted to control the ignition circuit of the engine, as illustrated in Fig. 1, wherein the switch 63 is illustrated as in series with the ignition system.

Current does not at first flow through the circuit above described. At this time, the thimble 44 being subjected to the temperature of relatively cold water in the jacket 1, is in its contracted condition and holds the element 46 longitudinally against the disc 50 with sufficient force to hold the arm 48 in position to maintain the contact 49 out of engagement with the contact 58. After operation of the engine has gone on for some time, the cooling water reaches a predetermined higher temperature which expands the thimble 44 longitudinally sufficiently to permit the arm 48 to move the contact 49 to engage the contact 50. Thereupon, current flows from the source 65, through the switch 63, heater 32, by wire 34 and wire 61 to the heater 60 and thence by wire 62, contacts 58 and 49, arm 48 to body 37 and thence to ground 68. This current heats the winding 60 immediately longitudinally expanding the element 46 thereby rocking the switch arm 48 to the right as viewed in Fig. 2 and breaking contact at 58—49. The element 46 then cools off relatively, permitting the contacts to close again, and this action goes on, the contacts 58—49 sending successive impulses of current over the circuit. The current from these impulses gradually heats the winding 32, causing the heat therefrom to expand the fluid in the power device 17, causing it in turn to project the stem 18 outwardly and rock the lever 20 to move the radiator vanes 5—5 to an open position.

If the temperature of the engine increases still farther, it will longitudinally expand the thimble 44 still more, releasing still more the longitudinal pressure of the element 46 on the disc 50, thus causing the resilient arm 48 to press the contact 49 more forcibly on the contact 58. The effect of this is to require a longer impulse of current in the winding 60 to sufficiently heat the element 46 to break contact at 58—49 resulting in longer impulses of current and more heat in the winding 32. This, in turn, results in greater expansion of the fluid and movement of the disc 50 to a more wide open position.

A strip of heat insulating material 82 is preferably interpositioned between the bracket 28 and the radiator 4, to reduce the amount of heat conveyed by the bracket from the radiator to the thermostat.

Also the thermostat will be preferably shielded in any suitable manner, from the direct path of air currents set up by the usual motor fan, not illustrated in the drawing, but which would commonly be placed on the forward end of the engine. Preferably also, the temperature of heat required to operate the thermostat will be considerably above that which could by any chance be communicated from the radiator or engine directly thereto. Reclosing of the radiator shutter, although not instantly, but with reasonable promptness after the ignition circuit is opened, is thereby assured.

The vanes 5 finally reach a position where the air admitted therethrough and through the radiator 4 checks further increase of temperature of the cooling fluid of the engine, and the rate and duration of the impulses becomes relatively constant, supplying heat energy at a relatively constant rate to the heater 32. By providing suitable heat storage capacity in the device 17, the vanes will not be moved by the current impulses, but will take up definite positions in their total range of movement corresponding to the amount of heat energy in the device 17 or to the rate and duration of the impulses.

Any change of temperature of the engine is followed by a change of temperature of the thimble 44 resulting, as above described, in a change of duration of the impulses of current and a change of position of the vanes 5.

Upon stopping the engine, or by opening the switch 63, the current is immediately discontinued and the heater 32 cools off restoring the vanes 5 to closed position. When the switch 63 is again closed, if the engine is already warm, the current impulses will begin at a rate and duration corresponding to that temperature and move the vanes at once to the corresponding position.

It will now be apparent, that the vanes 5 will be operated to take up various positions within their range of movement from full closed to full open position in accordance with the engine temperature to maintain the engine temperature at substantially a constant value thereby effecting a most efficient operation. The controller shown generally at 36 may be adjusted to vary the temperature at which it begins to send current impulses, by adjusting the screw 57 carrying the contact 58.

To adjust the range of temperature over which the vanes 5 will be moved from full closed to full open position, the following means is provided. The internal threads of the sleeve 41 and the thread 43 of the thimble 44 are made of the same pitch. If the body 37 be held rigidly against rotation and the thimble 44 also held against rotation and if the nut 42 then be turned, it will have the effect of changing the length of the thimble 44 which projects beyond the nut 42 but will not change the position of the thimble relative to the disc 50, thus that part of the thimble 44, the contraction and expansion of which moves the element 46 will be changed in length, and its response to changes of temperature will accordingly be varied. For example, if the thimble 44 is adjusted so that practically all of it projects from the nut 42, then a relatively small increase of engine temperature will result in a large degree of longitudinal expansion and effect a great movement of the vanes 5. Conversely, if only a relatively small portion of the thimble 44 projects from the nut 42, it will take a greater total change of engine temperature to move the vanes 5 to their full open position.

Again, the thimble 44 may be screwed into or out of the nut 42 to adjust the arm 48 to bring the contact 49 into the vicinity of the contact 58, whereby the adjustment of the contact 58 may be effective.

To adjust the positions of the vanes 5, to the temperature responsive characteristics of the power device 17, the stem 18 may be threaded into a head 80, the latter having pivot connection at 81 with the lever 20 and in the slot 19. Thus the rotative position of the lever 20 or any position of the stem 18 may be adjusted.

My invention is not limited to the exact details of construction shown and described. Many changes and modifications may be made therein without departing from the spirit of my invention or sacrificing its advantages.

I claim:

1. In an engine radiator shutter control system, a radiator shutter vane, a thermostat operatively connected thereto to move the same, an electric heater for the thermostat, a source of electric current, circuit connections and an electric controller associated with the engine and adapted, responsive to temperature changes thereof, to transmit to the thermostat heater electric current impulses of duration varying responsive to variations of engine temperature.

2. In an engine radiator shutter control system, in combination with the shutter mechanism, electro-responsive means adapted to move the same according to the average strength of current flowing therethrough, a source of electrical current, circuit connections and an electrical current flow controller associated with the engine, adapted, responsive to temperature changes thereof, to transmit to the electro-responsive means electrical current flows quantitatively corresponding to the temperature of the engine.

3. In an engine radiator shutter control system, a radiator shutter vane, a thermostat operatively connected thereto to move the same, an electric heater for the thermostat, a source of electric current, circuit connections and an electric controller associated with the engine and adapted, responsive to temperature changes thereof, to transmit to the thermostat heater electric current impulses, the integrated time-current value of which varies responsive to variations of engine temperature.

4. In an engine radiator shutter control system, a radiator shutter vane, a thermostat operatively connected thereto to move the same, an electric heater for the thermostat, a source of electric current, circuit connections and an electric controller associated with the engine and adapted, responsive to temperature changes thereof, to transmit to the thermostat heater electrical energy to heat the same, the amount of which varies responsive to changes of engine temperature.

5. In an engine radiator shutter control system, a radiator shutter vane, a thermostat operatively connected thereto to move the same, an electric heater for the thermostat, a source of electric current, circuit connections and an electric controller associated with the engine and adapted, responsive to temperature changes thereof, to transmit to the thermostat heater electrical energy to heat the same, the amount of which varies in accordance with changes of engine temperature.

6. In an engine radiator shutter control system, a radiator shutter vane, a thermostat operatively connected thereto to move the same, an electric heater for the thermostat, a source of electric current, circuit connections and an electric controller associated with the engine and adapted, responsive to temperature changes thereof, to transmit to the thermostat heater electric current impulses, the integrated time-current value of which varies responsive to variations of engine temperature, said controller comprising a pair of make-and-break contacts, a reciprocable element movable to make and break the contacts, and a thermo-responsive means for reciprocating the movable element.

7. In an engine radiator shutter control system, a radiator shutter vane, a thermostat operatively connected thereto to move the same, an electric heater for the thermostat, a source of electric current, circuit connections and an electric controller associated with the engine and adapted, responsive to temperature changes thereof, to transmit to the thermostat heater electric current impulses, the integrated time-current value of which varies responsive to variations of engine temperature, said controller comprising a pair of make-and-break contacts, a reciprocable element movable to make and break the contacts, and a thermo-responsive means for reciprocating the movable element variably in response to changes of engine temperature.

8. In an engine radiator shutter control system, a radiator shutter vane, a thermostat operatively connected thereto to move the same, an electric heater for the thermostat, a source of electric current, circuit connections and an electric controller associated with the engine and adapted, responsive to temperature changes thereof, to transmit to the thermostat heater electric current impulses, the integrated time-current value of which varies responsive to variations of engine temperature, said controller comprising a pair of make-and-break contacts, a thermally responsive element associated with the contacts to make and break them, and an electric heater for the element controlled by the contacts.

9. In an engine radiator shutter control system, a radiator shutter vane, a thermostat operatively connected thereto to move the same, an electric heater for the thermostat, a source of electric current, circuit connections and an electric controller associated with the engine and adapted, responsive to temperature changes thereof, to transmit to the thermostat heater electric current impulses, the integrated time-current value of which varies responsive to variations of engine temperature, said controller comprising a pair of make-and-break contacts, a thermo-responsive element associated with the contacts and movable to make and break them, an electric heater for the element responsive to the heat effect of which the element is movable, the heater circuit being controlled by the contacts, and a thermo-responsive means subjected to and responsive to engine temperature variations, adapted to vary the contact make-and-break responsiveness of the thermo-responsive element to the heating effect of the heater.

10. In an engine radiator shutter control system, a radiator shutter vane, a thermostat operatively connected thereto to move the same, an electric heater for the thermostat, a source of electric current, circuit connections and an electric controller associated with the engine and adapted, responsive to temperature changes thereof, to transmit to the thermostat heater electric current impulses, the integrated time-current value of which varies responsive to variations of engine temperature, said controller comprising a thermo-responsive movable means associated with the engine and movably responsive to temperature changes thereof, a thermo-responsive element provided with an electric heater, and movable by movement of the thermo-responsive means, a pair of make-and-break contacts in the circuit of the electric heater, the said element being adapted to respond to heating effect of the heater to make and break the contacts.

11. In an engine radiator shutter control system, a radiator shutter vane, a thermostat operatively connected thereto to move the same, an electric heater for the thermostat, a source of electric current, circuit connections and an electric controller associated with the engine and adapted, responsive to temperature changes thereof, to transmit to the thermostat heater electric current impulses, the integrated time-current value of which varies responsive to variations of engine temperature, said controller comprising an elongated thermally responsive means associated with the engine and subjected to the temperature thereof and responsive upon an increase of the temperature to expand longitudinally, an elongated thermo-responsive element provided with an electric heater, adapted to be moved longitudinally upon expansion of the thermo-responsive means and adapted to expand longitudinally responsive to heating effect of the heater, a pair of make-and-break contacts in the circuit of the electric heater associated with the thermo-responsive element and adapted to be broken upon longitudinal expansion of the element.

12. In an engine radiator shutter control system, a radiator shutter vane, a thermostat operatively connected thereto to move the same, an electric heater for the thermostat, a source of electric current, circuit connections and an electric controller associated with the engine and adapted, responsive to temperature changes thereof, to transmit to the thermostat heater electric current impulses, the integrated time-current value of which varies responsive to variations of engine temperature, said controller comprising an elongated thermally responsive means associated with the engine and subjected to the temperature thereof and responsive upon an increase of the temperature to expand longitudinally, an elongated thermo-responsive element provided with an electric heater, adapted to be moved longitudinally upon expansion of the thermo-responsive means and adapted to expand longitudinally responsive to heating effect of the heater, a pair of make-and-break contacts in the circuit of the electric heater associated with the thermo-responsive element and adapted to be broken upon longitudinal expansion of the element, and means for adjustably varying the effective length of the thermo-responsive means independently of longitudinal movement of the thermo-responsive element.

13. In an engine radiator shutter control system, in combination with the shutter mechanism, an electro-responsive means having a movable element connected with the shutter mechanism and movable gradually to all positions in a range of movement in response to variations of electric energy flowing thereto, a source of electric energy, circuit connections and an electric current flow controller associated with the engine, adapted, responsive to temperature changes thereof, to transmit to the electro-responsive means electric energy varying in correspondence with temperature changes of the engine.

14. In an engine radiator shutter control system, a radiator shutter vane, a thermostat operatively connected thereto to move the same, an electric heater for the thermostat, a source of electric current, circuit connections and an electric controller associated with the engine and adapted, responsive to temperature changes thereof, to transmit to the thermostat heater electric current impulses of duration varying responsive to variations of engine temperature, said controller comprising a pair of make and break contacts, a reciprocable element movable to make and break the contacts, and a thermal responsive member for reciprocating the movable element.

15. In an engine radiator shutter control system, a radiator or shutter vane, a thermostat operatively connected thereto to move the same, an electric heater for the thermostat, a source of electric current, circuit connections and an electric controller associated with the engine and adapted, responsive to temperature changes thereof, to transmit to the thermostat heater electric current impulses of duration varying responsive to variations of engine temperature, said controller comprising a pair of make and break contacts, a reciprocable element movable to make and break the contacts, and a thermal responsive member for reciprocating the movable element, and an electric heater for the thermal responsive member controlled by the contacts.

16. In an engine radiator shutter control system, a radiator shutter vane, a thermostat operatively connected thereto to move the same, an electric heater for the thermostat, a source of electric current, circuit connections and an electric controller associated with the engine and adapted, responsive to temperature changes thereof, to transmit to the thermostat heater electric current impulses of duration varying responsive to variations of engine temperature, said controller comprising a pair of make and break contacts, a reciprocable element movable to make and break the contacts, and a thermal responsive member for reciprocating the movable element, an electric heater for the thermal responsive member and responsive to the heat effect of which the member is movable, the heater being controlled by the contacts, and thermal responsive means subjected to and responsive to engine temperature variations and adapted to vary the contact make and break responsiveness of the thermal responsive member to the heating effect of the heater.

JOHN W. ANDERSON.